United States Patent [19]
Martin

[11] Patent Number: 5,681,095
[45] Date of Patent: Oct. 28, 1997

[54] DUMP BODY FOR A VEHICLE

[75] Inventor: John C. Martin, Toronto, Canada

[73] Assignee: Diesel Equipment Limited, Toronto, Canada

[21] Appl. No.: 582,478

[22] Filed: Jan. 3, 1996

[51] Int. Cl.⁶ ..................................................... B60P 1/16
[52] U.S. Cl. .................... 298/22 R; 220/691; 296/184; 296/191
[58] Field of Search ................................ 105/400, 401, 105/409; 220/562, 678, 691, DIG. 24; 296/183, 184, 188; 298/22 R

[56] References Cited

U.S. PATENT DOCUMENTS

| | | |
|---|---|---|
| 2,144,889 | 1/1939 | Moodie . |
| 2,494,081 | 1/1950 | Baghuis . |
| 3,043,628 | 7/1962 | Hockensmith, Jr. ............ 298/22 R |
| 3,788,682 | 1/1974 | Ehrlich . |
| 4,863,189 | 9/1989 | Lindsay . |
| 5,033,794 | 7/1991 | Vick ............................ 298/22 R |
| 5,052,741 | 10/1991 | Brown et al. ................. 296/191 |
| 5,338,101 | 8/1994 | Colip ............................ 298/17 R |
| 5,454,620 | 10/1995 | Hill et al. ..................... 296/184 |

FOREIGN PATENT DOCUMENTS

| | | |
|---|---|---|
| 499442 | 1/1954 | Canada ............................ 298/22 R |
| 2058661 | 3/1992 | Canada ............................ 296/184 |
| 0271137 | 6/1988 | European Pat. Off. . |
| 0314119 | 5/1989 | European Pat. Off. . |
| 2510957 | 2/1983 | France ............................ 298/22 R |
| 55-148662 | 11/1980 | Japan . |
| 844445 | 7/1981 | U.S.S.R. . |
| 1181928 | 9/1985 | U.S.S.R. . |
| 954178 | 4/1964 | United Kingdom . |

*Primary Examiner*—Janice L. Krizek
*Attorney, Agent, or Firm*—Marshall, O'Toole, Gerstein, Murray & Borun

[57] ABSTRACT

A dump body for a vehicle has a floor slab with a front panel located proximate the front end of the floor slab. A pair of side panels extending upwardly from opposed sides of the floor slab are structurally connected thereto and to the front panel. A plurality of spaced trusses are welded to the under surface of the floor slab. A hinge at the rear of the dump body permits tipping of the dump body relative to the frame members of the vehicle by a hoist. The floor slab and trusses are made of steel and the side and front panels are made from aluminium.

13 Claims, 6 Drawing Sheets

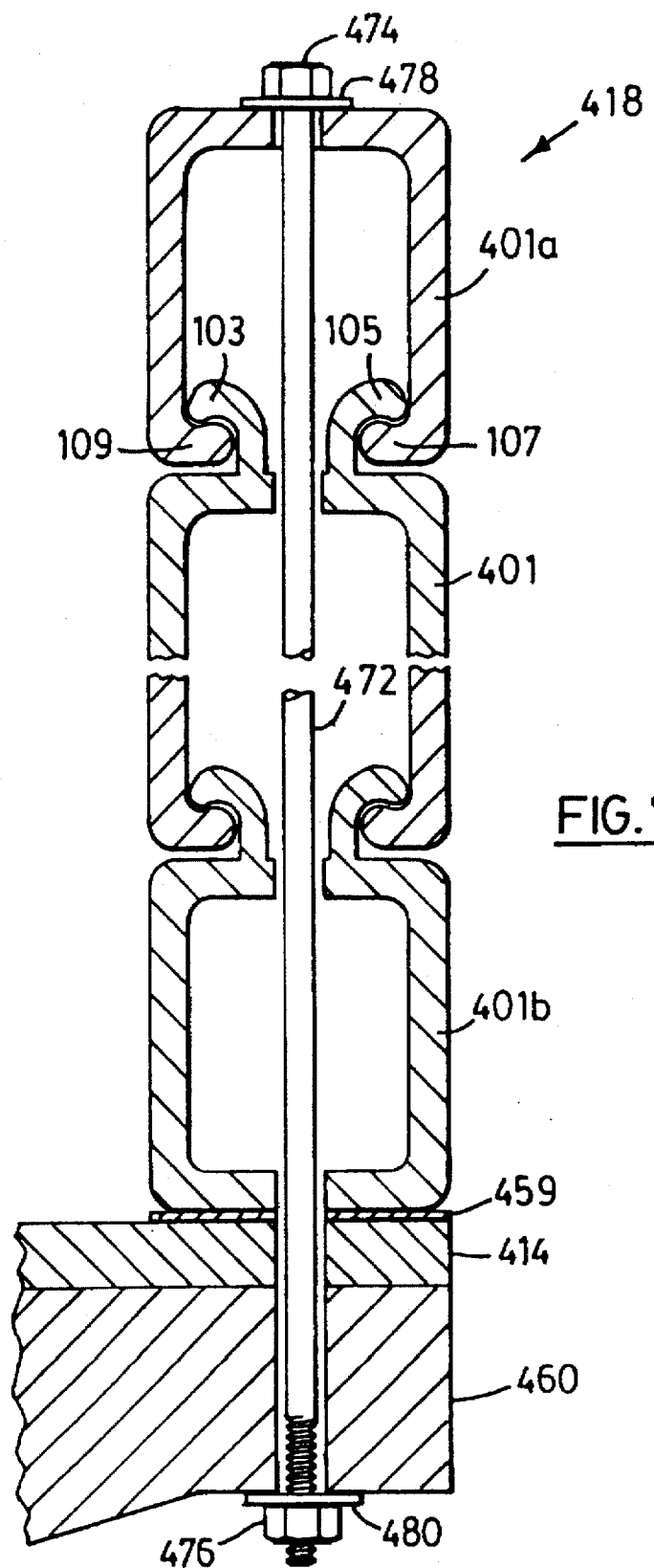

1

DUMP BODY FOR A VEHICLE

FIELD OF THE INVENTION

This invention relates to dump bodies for a vehicle, such as a dump truck or dump trailer.

DESCRIPTION OF THE PRIOR ART

A dump body is secured to the frame of a vehicle such as a truck or trailer and carries a load therein. The dump body tips relative to the frame to permit discharge of the load. Dump bodies must be strong enough to carry and support heavy loads both when the vehicle is travelling, and when the dump body is tilted. Consequently, conventional dump bodies are usually made from steel or aluminium plating and have several structural steel or aluminium support members, such as beams, to provide support.

In one type of conventional dump truck, the body is pivoted at its rear and has a pair of longitudinal steel beams (known as longsills) located at the underside of the steel plate floor, to support the floor. Longsills run between the pivot point at the rear of the body, forward to the front of the body, where the truck body is lifted. Smaller steel joist members or cross sills (typically of I-beam or channel configuration) either lie upon the longsills and are welded directly to the underside of the floor or are co-planar with the longsills to support both the floor and the load carried in the body. When the dump body is loaded and is in the elevated position, the body elements undergo maximum stress and bending, because the body is supported at only a few locations. As a result, the body must be reinforced. When the dump body is in the travelling (ie. lowered) position, the longsills sit directly on the truck chassis frame members, generally reducing the bending stresses in the body elements.

The body is typically lifted by means of a hydraulic hoist which tips the body relative to the chassis. The forces of the hoist are usually applied at or near the front of the dump body, and most often directly to the front panel. When the truck body is tilted, and is in an elevated position, the load in the dump body is transferred from the floor, through joist members, or directly, to the longsill members. Thus, the structural strength of the longsills must be considerable to support the load on the longsills.

In some conventional truck bodies it will be necessary to reinforce the side walls of the body as a significant amount of force may be applied transversely to the side wall tending to cause the side walls to bend outwards because of the load. Such side wall reinforcement may be accomplished by providing structural framing of the side wall. However in such dump bodies, when the body is tilted, the lifting force is still applied in such a manner that the structural longsill members will carry the load.

Another type of body is known as a monocoque body which provides for spaced, longitudinal tube members, located beneath the floor and at the corners inside the load containment area. The tube members provide the necessary structural support for the body.

If, as is often the case, many of the elements of the dump body are made from steel, the weight of the dump body will be considerable. It will be appreciated that this is undesirable because, inter alia, it reduces the payload available in a truck. Furthermore, with increased weight, the dump truck will be relatively more expensive to operate because of significant fuel expenses. A further problem with utilizing steel elements for the dump truck body is rust. As aluminum is substantially free of rust, and relatively light compared to steel, there is a desire to use members made from aluminum in a dump truck body to the greatest degree possible. On the other hand, aluminum does have the drawbacks that it is expensive, difficult to weld, and not as abrasion resistant as steel.

SUMMARY OF THE INVENTION

In its broadest aspect, the invention herein provides a dump body which allows for the structural longsill members used in the conventional dump bodies to be eliminated, or at least substantially reduced in size, as the dump body structure is such that a large portion of the weight of a load carried in the dump body is transmitted from the floor to structural side walls to the front panel which is supported by a hoist.

According to this invention there is provided a dump body for a vehicle for containing a load, said vehicle having a pair of longitudinal spaced frame members, said dump body comprising: a floor member having an upper load supporting surface, said floor member extending longitudinally between a front end and a back end and said floor member having opposed side edges; a front panel located proximate said front end of said floor member and extending generally upwardly from said floor member; first and second side panels, each side panel extending upwardly from proximate a respective side edge of said floor member and extending from proximate said front end to proximate said back end of said floor member, each of said side panels being rigidly connected to said front panel and rigidly connected to said floor member, each of said side panels having an inner side wall, and an outer side wall spaced from said inner side wall; said upper surface of said floor member, said inner side walls of said side panels and said front panel defining a load containment area, a plurality of spaced trusses rigidly connected to a lower surface of said floor member, each of said trusses extending transversely from a side edge of said floor member to an opposed side edge of said floor member; a force means for applying a tipping force to said dump body at a location on said front panel) a hinge connection between said dump body and said frame members for permitting said dump body to pivot between a first lowered position whereat said transverse trusses rest on said frame members and a weight of said floor member and a weight of any load contained in said load containment area is supported by said frame members through said transverse trusses, and a second position whereat said front panel is elevated relative to said frame members and relative to said back end of said floor member and whereat at least a portion of a force generated by said weight of any load carried by said floor member and said weight of said floor member is transferred to said side panels and along said side panels to said front panel and to said location where said force means applies said tipping force.

BRIEF DESCRIPTION OF THE DRAWINGS

In the figures which illustrate example embodiments of a dump body made accordance with the invention:

FIG. 4b is a transverse sectional view of a plank of the side panel of FIG. 4a;

FIG. 5b is a transverse sectional view of a plank of the side panel of FIG. 5a;

FIG. 7 is a transverse sectional view of a portion of a side panel made in accordance with a further aspect of this invention.

DETAILED DESCRIPTION OF THE PREFERRED EMBODIMENTS

Figure 1:
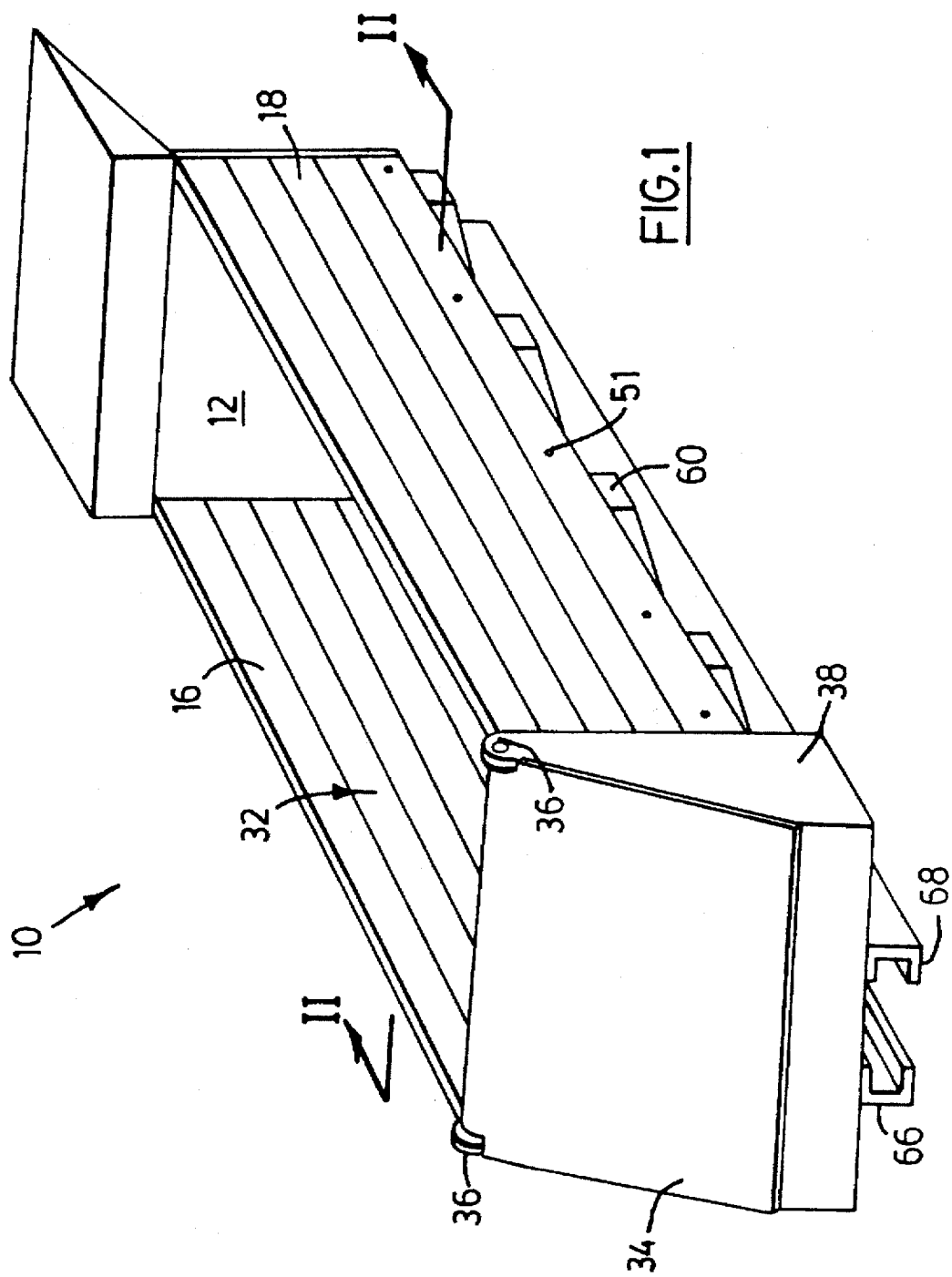
FIG. 1 is a perspective view of an example embodiment.
Figure 2:
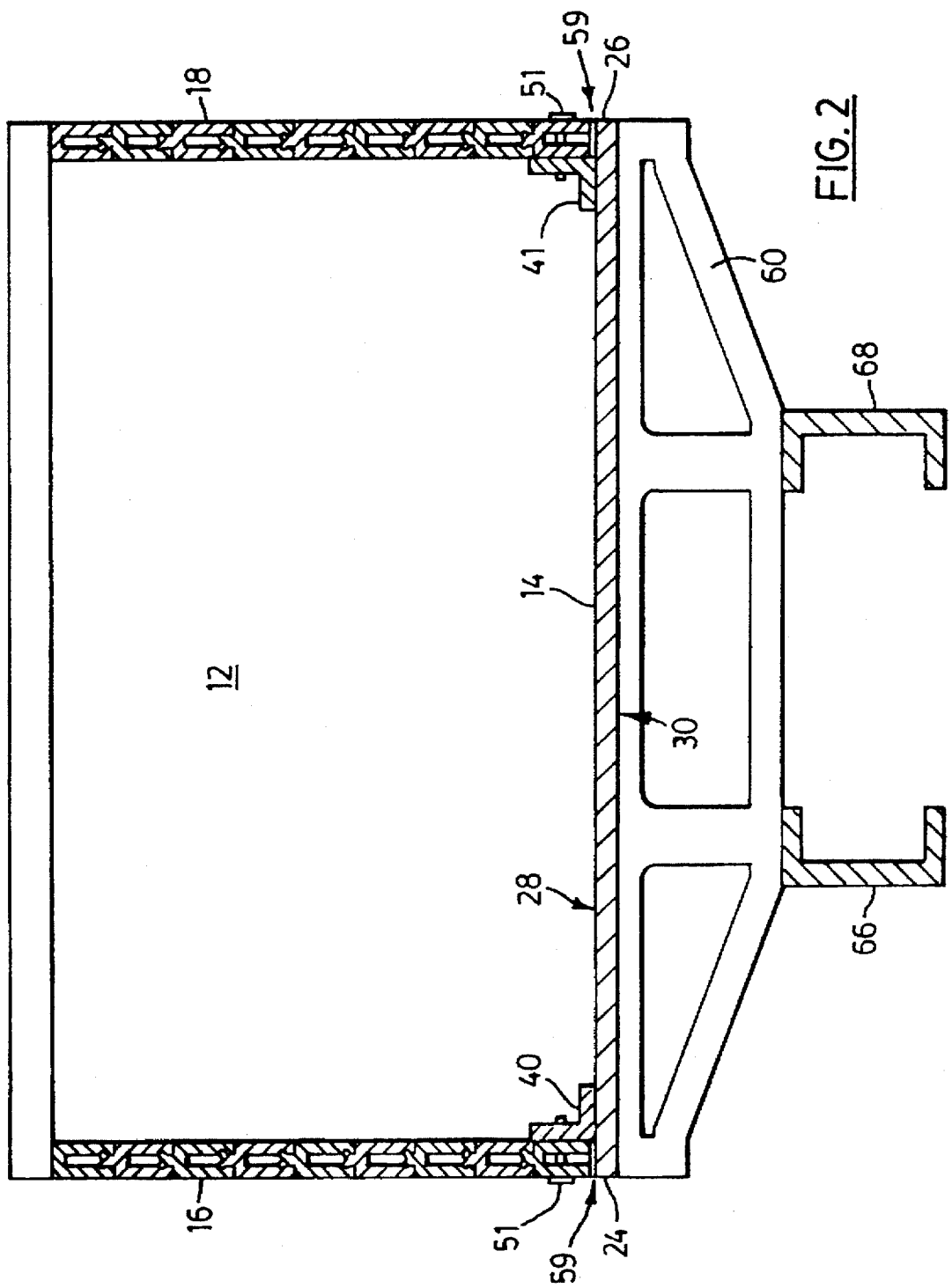
FIG. 2 is a transverse sectional view along II—II of FIG. 1.
Figure 3:
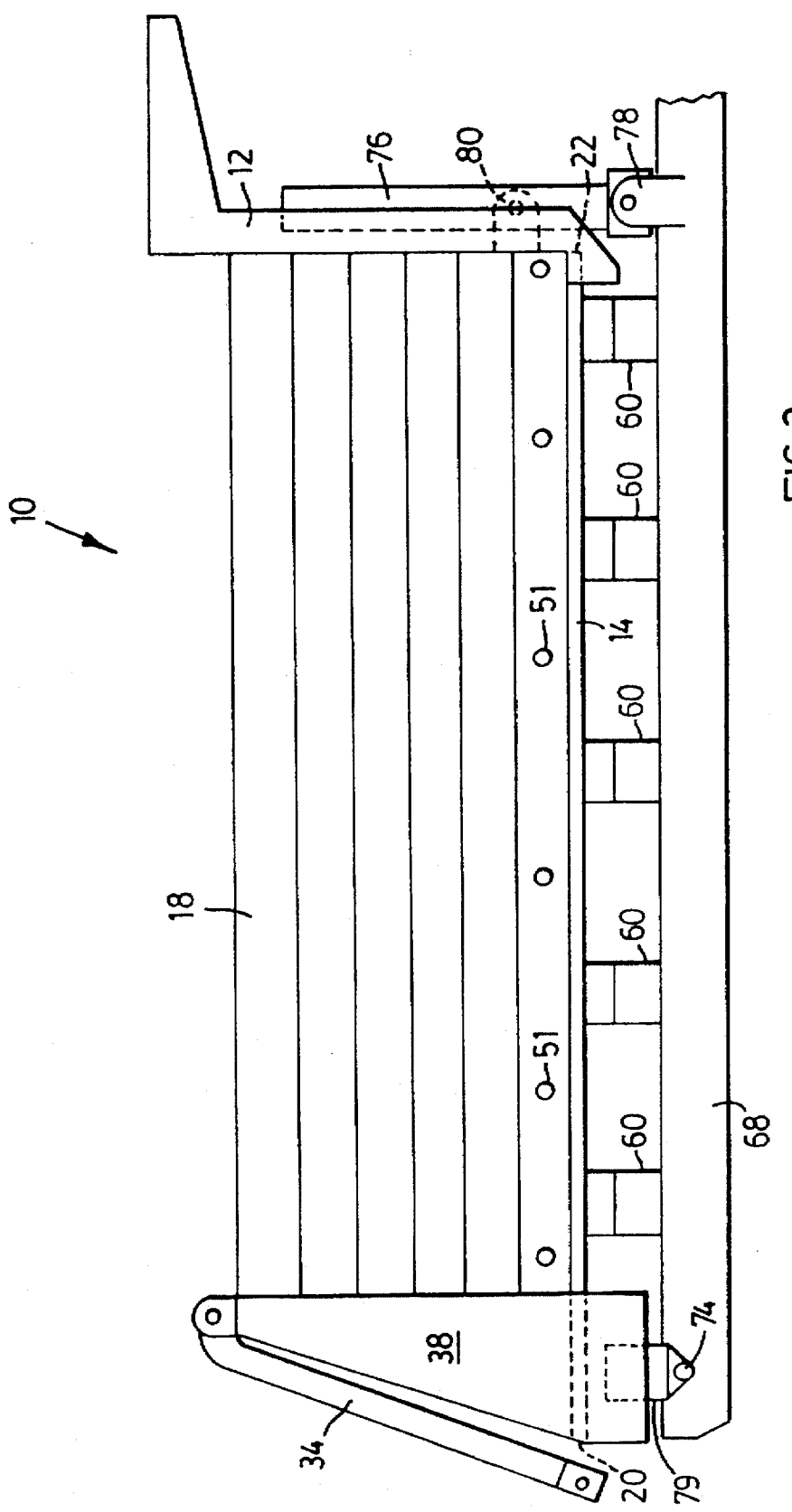
FIG. 3 is a side view of the dump body of FIG. 1.

FIGS. 1, 2, and 3 show a dump truck body indicated generally by reference number 10. The dump truck body has a front panel 12, a floor member—which is preferably a steel slab 14—and a pair of side panels 16 and 18. Floor slab 14 has a rear edge 20, a front edge 22, and side edges 24 and 26. Floor slab 14 also has an upwardly directed surface 28 and a downwardly directed opposed surface 30.

Longitudinally directed upstanding supports in the nature of angle irons 40 and 41 are welded to the upper surface 28 of floor slab 14 proximate either side 24, 26 thereof. The side panels 16 and 18 are bolted by bolts 51 to the angle irons 40, 41, respectively. Additionally, or alternatively, the side panels may be welded to the angle irons.

Front panel 12 is secured to the front edge 22 of floor 14 as well as to the side panels. The securement of front panel 12 to side panels 16 and 18 and floor 14 is by welding and/or bolting. It is important that this connection between side panels 16, 18 and front panel 12 have a high load bearing capacity.

Together floor slab 14, front panel 12 and side panels 16 and 18 define a load containing area 32. Load containing area 32 may have its integrity increased by applying a continuous layer of FIBREGLASS™, KEVLAR™, or carbon fibres to the floor slab, front panel and side panels in the load containment area 32. A load (not shown) would be retained in the load containing area 32 and secured therein with a tailgate 34 which would pivot and be supported along a top edge by hinges 36 which are secured to corner posts 38. Corner posts 38 are secured to side panels 16, 18 by welding or bolting. The primary purpose of corner posts 38 is to act as stiffening elements for the rear portion Of the dump body 10, so as to assist in maintaining the side panels 16 and 18 normal to floor slab 14 at the rear of the dump body.

Figure 4B:
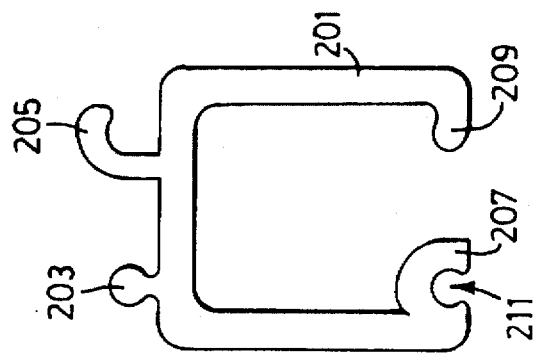
Figure 4A:
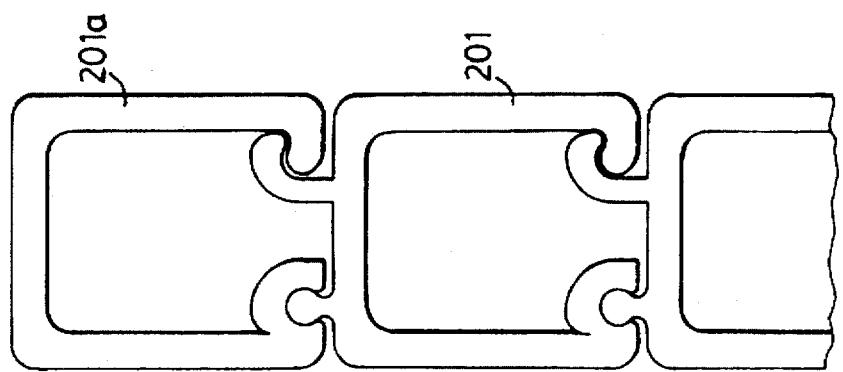
FIG. 4a is a transverse sectional view of a portion of a side panel in the dump body of FIG. 1.

Side wall panels 16 and 18 and, optionally, front panel 12 are of a hollow double-walled construction. Preferably, each panel is constructed from a plurality of extruded double-walled aluminum planks. With reference to FIGS. 4a and 4b, a cross-sectional view of part of side panel 16 is shown. Side panel 16 has a plurality of planks 101. Each plank 101 has an inner side wall 106, an outer side wall 108, and (with the exception of the top plank 101a) a pair of opposed outwardly directed crooked fingers 103, 105 for mating with corresponding opposed inwardly directed crooked fingers 107, 109 of an adjacent panel. Arms 103, 105 are resilient to permit the inwardly directed crooked fingers of one plank to be snapped into engagement with the outwardly directed crooked fingers of an adjacent plank. Optionally, a weld line 112 extends along the inside walls 106 of adjacent planks 101 to strengthen the interconnection between adjacent planks.

Figure 5B:
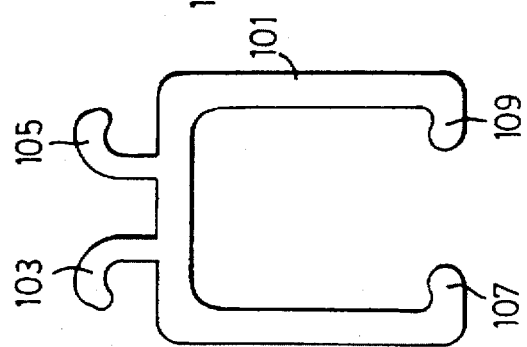
Figure 5A:
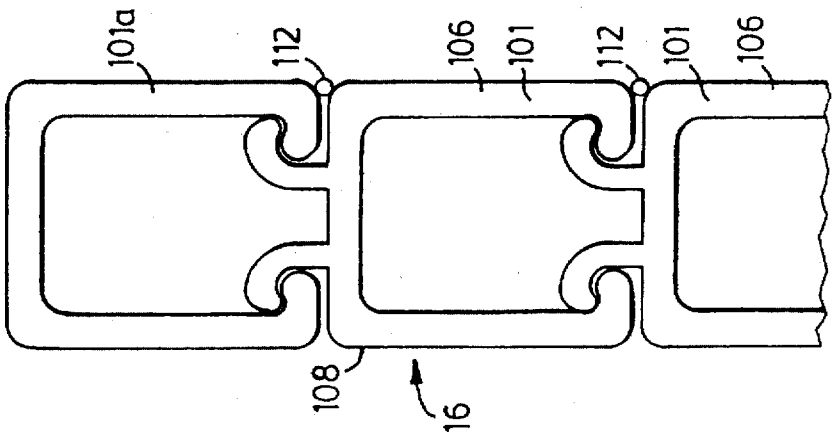
FIG. 5a is a transverse sectional view of an alternate embodiment of a portion of the side panel of a dump body of FIGS. 1 to 3.

An alternate embodiment for side panel 16 is shown in FIGS. 5a and 5b. Each plank 201 (except the top plank 201a) has a finger 203 with a bulbous end and a spaced outwardly directed crooked finger 205 at one end of the plank for mating with a slot 211 and a spaced inwardly directed crooked finger 209 of an adjacent plank. More particularly, slot 211 is designed to receive the bulbous end of the finger 203 of an adjacent plank 201. Finger 205 may then be hooked around finger 209 of the adjacent plank by a rolling motion of one plank relative to the other.

Because the side panels are preferably formed of aluminum and the floor slab of steel, a corrosion inhibiting or insulating layer 59 of FIBREGLASS™, stainless steel, MYLAR™, or paint is provided therebetween.

A plurality of transverse truss members 60 are welded to the lower surface 30 of floor slab 14. The transverse truss members 60 are made from steel. Truss members 60 are spaced to avoid interference with the wheels of the truck when the body is attached to the chassis. The trusses may be of any configuration that provides a relatively high strength to weight ratio, and provides adequate strength, given the particular design criteria.

With reference to FIG. 3 the dump body 10 has a hinged connection 74 with the frame members 66 (FIGS. 1 and 2) and 68 of the chassis for pivoting movement between the dump body 10 and the frame members 66, 68, respectively. A steel plate element 79 is provided at each hinge 74, providing the structural connection between the dump body and frame member.

A telescopic hydraulic hoist 76 is pivotally attached at hinges 78 to the frame members 66 and 68 of the chassis. The telescopic hydraulic hoist 76 is secured to the dump truck body 10 at a pivoting connection 80 secured to front panel 12, and may apply a lifting force, on demand, to tilt the dump body relative to the chassis.

When the dump truck body 10 is in the lowered position shown in FIGS. 1 to 3, the trusses 60 rest directly upon the truck chassis members 66 and 68. Consequently, the force emanating from the weight of a load in the load containing area 32, and the weight of floor slab 14 itself, will be transmitted from the floor slab, through the steel truss members 60, to frame members 66 and 68.

When the dump truck body is raised to an elevated position by telescopic hydraulic hoist 76, the dump truck body will pivot about hinges 74. The force emanating from the weight of a load carried in the load containing area 32 and the weight of the floor slab itself is transmitted to the frame chassis via hinge connections at 74 and 78. The way in which the force is transferred to the chassis when the body is tilted is significant. When the body is tilted, a large proportion of the force bearing on floor slab 14, and of the weight of floor slab 14 itself, is transmitted to side panels 16 and 18 because of the structural connection between the floor slab and side panels. The side panels 16 and 18 transmit this force to the front panel, and the front panel transfers it to hinge connection 78. Thus, when the dump truck hoist 76 tilts the truck body 10 by applying a lifting force to front panel 12, the force will be transferred from the floor through side panels 16 and 18, to front panel 12.

Side panels 16, 18, being made of aluminium, are relatively light. Nevertheless, because the bending forces applied to them by the combined weight of the load and the floor slab act in a direction generally parallel to their height, and because their height is significant, they are able to resist these bending forces.

In the tipped position, the sole purpose of trusses 60 is to stiffen floor slab 14.

In some instances, it may be desired to provide a pair of longsills which sit on frame members 66, 68. In such instance, hinges 74 and 78 pivotably join the longsills to the dump body 10 and the longsills are bolted to the frame members.

If the side panels 16, 18 are joined solely by bolts to the angle irons 40 and 41, the front panel 12, and the corner posts 38, then the dump body 10 may be readily shipped in a broken down kit form.

Figure 6:
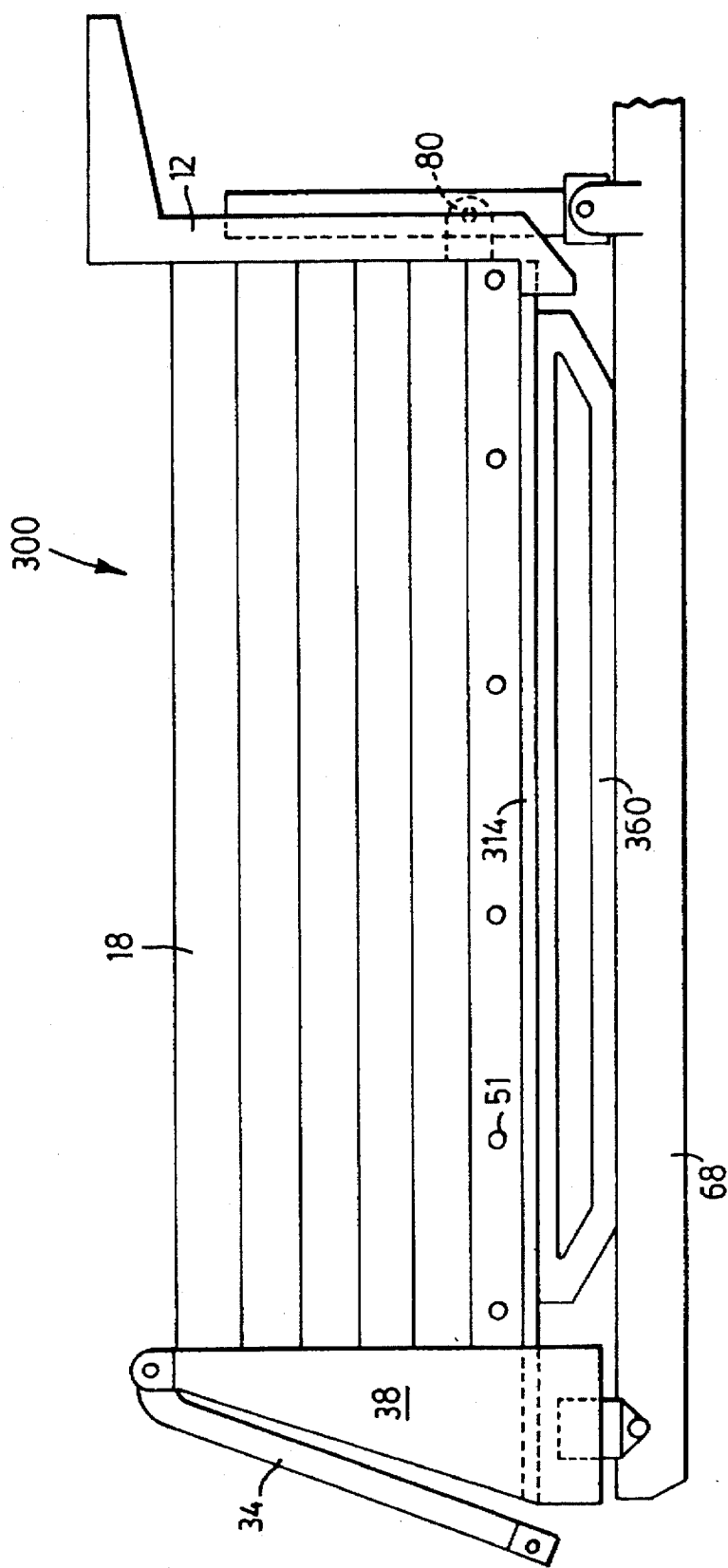
FIG. 6 is a side view of a dump body made in accordance with another embodiment of this invention.

FIG. 6 illustrates an alternate embodiment of the invention. Turning to FIG. 6 wherein like parts have been given like reference numerals, transverse trusses 60 of FIGS. 1 to 3 have been replaced with a pair of longitudinal trusses 360 which are welded to the floor slab 314. In the lowered position of the dump body 300, the trusses 360 rest on the frame members 66, 68 so as to support any load in the load containing area. However, similarly to the dump body 10 of FIGS. 1 to 3, when dump body 300 is tipped, the weight of the load and floor is transmitted to the hinge connection 80 through side panels 16 and 18 and front panel 12. While trusses 360 act to stiffen floor slab 314, there are only two of them in comparison with the plurality of trusses 60 for the dump body 10 of FIGS. 1 to 3. To compensate, floor slab 314 is thicker than floor slab 14 of FIGS. 1 to 3.

If floor slab 14 is of sufficient thickness, it may be possible to dispense with supporting truss members entirely. In this case, the floor slab would rest directly upon the frame members when the dump body is in the lowered position.

FIG. 7 illustrates a further embodiment of the invention. Turning to FIG. 7 wherein like parts have been given like reference numerals, each plank of side panel 418 has a bore 470 through both of its ends which accommodates bolt 472. The corrosion resisting layer 459, floor slab 414 and truss 460 also have a bore to accommodate bolt 472. The bolt therefore sandwiches the side panel 418, floor slab 414, and truss 460 between its head 474 and a nut 476. Washers 478, 480 may also be provided. Several such bolts are provided through both sides. Bolts 472 strengthen the interconnection between planks 401 and can take the place of weld line 112 (FIG. 4a). Bolts 472 also provide a structural interconnection between the side panels and the floor slab and therefore can take the place of angle irons 40, 41 and bolts 60 (FIG. 2).

The dumping body of this invention may be applied to other vehicles for dumping, such as a dumping trailer.

While the floor member is preferably a steel slab 14, the floor member may also be a slab of aluminum or FIBREGLASS™. Further, in some applications, the floor member may be other than a slab. The front panel 12 may be made of FIBREGLASS™, stainless steel, or aluminum. In the case of a FIBREGLASS™ floor slab or front panel, other components are bolted to the floor slab or front panel, rather than being welded to it.

Wooden planks may be provided on frame members 66 and 68 so that truss members 60 (FIG. 1) or 360 (FIG. 6) rest on these when the dump body is in its lowered position.

Various other changes and enhancements are possible without departing from the invention as hereinafter claimed.

From the foregoing, it will be apparent that the dump body of this invention may, by fabricating the side and front panels from aluminum, be made relatively light, while remaining strong.

What is claimed is:

1. A dump body for a vehicle for containing a load, said vehicle having a pair of longitudinal spaced frame members, said dump body comprising:

a floor member having an upper load supporting surface, said floor member extending longitudinally between a front end and a back end and said floor member having opposed side edges;

a front panel located proximate said front end of said floor member and extending generally upwardly from said floor member;

first and second side panels, each side panel extending upwardly from proximate a respective side edge of said floor member and extending from proximate said front end to proximate said back end of said floor member, each of said side panels being rigidly connected to said front panel and rigidly connected to said floor member, each of said side panels having an inner side wall, and an outer side wall spaced from said inner side wall;

said upper surface of said floor member, said inner side walls of said side panels and said front panel defining a load containment area;

a plurality of spaced trusses rigidly connected to a lower surface of said floor member, each of said trusses extending transversely from a side edge of said floor member to an opposed side edge of said floor member;

a force means for applying a tipping force to said dump body at a location on said front panel;

a hinge connection between said dump body and said frame members for permitting said dump body to pivot between a first lowered position whereat said transverse trusses rest on said frame members and a weight of said floor member and a weight of any load contained in said load containment area is supported by said frame members through said transverse trusses, and a second position whereat said front panel is elevated relative to said frame members and relative to said back end of said floor member and whereat at least a portion of a force generated by said weight of any load carried by said floor member and said weight of said floor member is transferred to said side panels and along said side panels to said front panel and to said location where said force means applies said tipping force.

2. The dump body of claim 1 wherein each side panel is comprised of a plurality of longitudinally oriented, double walled plank members and including a plurality of rods extending downwardly through each plank member of each of said side panels arranged to interconnect the plurality of plank members of each of said side panels.

3. The dump body of claim 2 wherein each of said rods of a side panel is connected to one of said support members such that said rods rigidly connect said side panel to said floor member.

4. The dump body of claim 1 wherein each side panel is comprised of a plurality of longitudinally oriented, double walled plank members, each of said plank members having means to rigidly interconnect to an adjacent, longitudinally oriented plank member.

5. The dump body of claim 4, wherein said plank members are made of aluminium.

6. The dump body of claim 5 wherein said floor member is a steel slab.

7. The dump body of claim 4 wherein said interconnection means comprises, for a pair of adjacent plank members, a complementary pair of snap fit fasteners.

8. The dump body of claim 7 wherein said complementary pair of snap fit fasteners comprise two opposed outwardly directed crooked fingers extending from a first one of said pair of plank members and two opposed inwardly directed crooked fingers extending from a second one of said pair of adjacent plank members.

9. The dump body of claim 7 wherein said complementary pair of snap fit fasteners comprise a bulb and a spaced outwardly directed crooked finger extending from a first one of said pair of plank members and a bulb receiving opening and a spaced inwardly directed crooked finger extending from a second one of said pair of adjacent plank members.

10. The dump body of claim 7 including a line of welding between each adjacent pair of plank members extending adjacent an inner side wall of said each adjacent pair.

11. The dump body of claim 7 comprising a pair of upstanding supports one of said supports rigidly affixed to said floor member proximate each edge thereof, each of said side panels being bolted to a respective one of said upstanding supports.

12. A dump body for a vehicle for containing a load, said vehicle having a pair of longitudinal spaced frame members, said dump body comprising:

a floor member having an upper load supporting surface, said floor member extending longitudinally between a front end and a back end and said floor member having opposed side edges;

a front panel located proximate said front end of said floor member and extending generally upwardly from said floor member;

first and second side panels, each side panel extending upwardly from proximate a respective side edge of said floor member and extending from proximate said front end to proximate said back end of said floor member, each of said side panels being comprised of a plurality of pairs of longitudinally oriented, double walled plank members, each pair of said plank members interconnected by a complementary pair of snap fit fasteners comprising a bulb and a spaced outwardly directed crooked finger extending from a first one of said pair of plank members and a bulb receiving opening and a spaced inwardly directed crooked finger extending from a second one of said pair of adjacent plank members;

said upper surface of said floor member, said inner side walls of said side panels and said front panel defining a load containment area;

a force means for applying a tipping force to said dump body at a location on said front panel;

a hinge connection between said dump body and said frame members for permitting said dump body to pivot between a first lowered position and a second position whereat said front panel is elevated relative to said frame members and relative to said back end of said floor member.

13. A dump body for a vehicle for containing a load, said vehicle having a pair of longitudinal spaced frame members, said dump body comprising:

a floor member having an upper load supporting surface, said floor member extending longitudinally between a front end and a back end and said floor member having opposed side edges;

a front panel located proximate said front end of said floor member and extending generally upwardly from said floor member; first and second side panels, each side panel extending upwardly from proximate a respective side edge of said floor member and extending from proximate said from end to proximate said back end of said floor member, each of said side panels being comprised of a plurality of longitudinally oriented, double walled plank members and including a plurality of rods extending downwardly through each plank member of each of said side panels arranged to interconnect the plurality of plank members of each of said side panels; said upper surface of said floor member, said inner side walls of said side panels and said front panel defining a load containment area;

a force means for applying a tipping force to said dump body at a location on said front panel;

a hinge connection between said dump body and said frame members for permitting said dump body to pivot between a first lowered position and a second position whereat said front panel is elevated relative to said frame members and relative to said back end of said floor member.

\* \* \* \* \*